(12) United States Patent
Nakamura et al.

(10) Patent No.: US 10,464,504 B2
(45) Date of Patent: Nov. 5, 2019

(54) CIRCUIT BODY FOR VEHICLE

(71) Applicant: YAZAKI CORPORATION, Tokyo (JP)

(72) Inventors: Masashi Nakamura, Tochigi (JP); Masahiro Furukawa, Tochigi (JP); Satoshi Enomoto, Tochigi (JP); Akiyoshi Kanazawa, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/198,674

(22) Filed: Nov. 21, 2018

(65) Prior Publication Data

US 2019/0168692 A1    Jun. 6, 2019

(30) Foreign Application Priority Data

Dec. 4, 2017 (JP) .................................. 2017-232891

(51) Int. Cl.
| | | |
|---|---|---|
| *B60R 16/02* | (2006.01) | |
| *B60R 16/023* | (2006.01) | |
| *B60R 16/03* | (2006.01) | |

(52) U.S. Cl.
CPC ...... *B60R 16/0207* (2013.01); *B60R 16/0238* (2013.01); *B60R 16/0239* (2013.01); *B60R 16/03* (2013.01)

(58) Field of Classification Search
None
See application file for complete search history.

(56) References Cited

U.S. PATENT DOCUMENTS

| | | | | | |
|---|---|---|---|---|---|
| 5,252,091 | A | * | 10/1993 | Fujita ..................... | H01R 25/14 439/499 |
| 5,442,810 | A | * | 8/1995 | Jenquin ................... | B60T 17/04 174/47 |
| 5,818,673 | A | * | 10/1998 | Matsumaru ............... | H02J 1/06 361/63 |
| 5,912,511 | A | * | 6/1999 | Hidaka ............... | B60R 16/0207 174/72 A |
| 6,182,807 | B1 | * | 2/2001 | Saito ................... | B60G 17/0185 191/2 |
| 6,249,060 | B1 | * | 6/2001 | Osha ........................ | B60L 3/12 307/10.1 |
| 6,291,770 | B1 | * | 9/2001 | Casperson .......... | B60R 16/0207 174/139 |

(Continued)

FOREIGN PATENT DOCUMENTS

JP            2005-78962 A        3/2005

*Primary Examiner* — Xanthia C Cunningham
(74) *Attorney, Agent, or Firm* — Kenealy Vaidya LLP

(57) ABSTRACT

A circuit body for a vehicle is wired on a vehicle body of the vehicle for performing supply of electric power to an electrical component and communication of various communication signals with the electrical component. The circuit body includes: a plurality of control boxes separately disposed on the circuit body and capable of controlling input and output of at least one of the electric power and the communication signal; a trunk line harness connecting one of the plurality of control boxes and another of the plurality of control boxes; and a branch line harness connecting the control box and the electrical component. At least one of the plurality of control boxes is grounded via the electrical component connected to the branch line harness.

5 Claims, 10 Drawing Sheets

(56) References Cited

U.S. PATENT DOCUMENTS

| | | | | |
|---|---|---|---|---|
| 7,336,159 | B2* | 2/2008 | Fackrell | B60T 7/042 |
| | | | | 303/123 |
| 9,006,939 | B2* | 4/2015 | Toyama | B60R 16/0215 |
| | | | | 307/147 |
| 10,122,125 | B2* | 11/2018 | Maki | H01R 13/6691 |
| 10,279,755 | B2* | 5/2019 | Yamada | B60R 16/0207 |
| 10,367,270 | B2* | 7/2019 | Breed | B60R 16/0207 |
| 10,391,886 | B2* | 8/2019 | Wortberg | B60L 1/00 |
| 2002/0189843 | A1* | 12/2002 | Ito | H01B 7/36 |
| | | | | 174/72 A |
| 2004/0227402 | A1* | 11/2004 | Fehr | B60R 16/0315 |
| | | | | 307/10.1 |
| 2006/0031590 | A1* | 2/2006 | Monette | H04W 84/005 |
| | | | | 709/249 |
| 2011/0067920 | A1* | 3/2011 | Toyama | B60R 16/0207 |
| | | | | 174/72 A |
| 2011/0088944 | A1* | 4/2011 | Ogue | B60R 16/0215 |
| | | | | 174/72 A |

* cited by examiner

CIRCUIT BODY FOR VEHICLE

CROSS-REFERENCES TO RELATED APPLICATIONS

This application is based on and claims priority from Japanese Patent Application No. 2017-232891 filed on Dec. 4, 2017, the entire contents of which are incorporated herein by reference.

FIELD

One or more embodiments of the present invention relate to a circuit body for a vehicle.

BACKGROUND

In recent years, a circuit body (so-called wire harness) for connecting a power supply or the like mounted on a vehicle to various electrical components or the like is known. Generally, this type of the circuit body is constituted so as to be able to realize appropriate supply of electric power from a main power supply such as an alternator (power generator) and a battery to a large number of electrical components (for example, ECU and various auxiliary devices), appropriate switching of power supply or cutoff, transmission of various communication signals, and the like.

Specifically, this type of the circuit body (wire harness) is generally constituted of a wire bundle which is an aggregate of various kinds of electric wires connecting a power supply and electrical components, a junction block for distributing electric power to a plurality of systems, a relay box for controlling supply or cutoff of electric power to each system, fuse box which protects wires and electrical components from excessive current, and the like (see JP-A-2005-78962, for example).

SUMMARY

In recent years, the structure of a circuit body (wire harness) tends to be complicated with an increase in electrical components mounted on a vehicle, complication of control, and the like. As a result, there are an increase in the number of electric wires constituting the circuit body, an increase in the size of the circuit body, and the like, and therefore the weight of the circuit body tends to increase. In addition, with differences in the types of vehicles to be equipped with the circuit body and an increase in the types of optional electrical components, the types of circuit bodies to be manufactured are increased and the process of manufacturing the circuit body also becomes complicated, and thus the manufacturing cost and the manufacturing time of the circuit body also tend to increase.

One or more embodiments of the invention have been made in view of the circumstances described above and an object thereof is to provide a circuit body for a vehicle which has a simplified structure of the circuit body while functions required as a circuit body for a vehicle are maintained.

In order to achieve the above-described object, the features of a circuit body for a vehicle according to one or more embodiments of the invention are briefly summarized and listed below in (1).

(1) A circuit body for a vehicle which is wired on a vehicle body of the vehicle for performing supply of electric power to an electrical component and communication of various communication signals with the electrical component, the circuit body including:

a plurality of control boxes separately disposed on the circuit body and capable of controlling input and output of at least one of the electric power and the communication signal;

a trunk line harness connecting one of the plurality of control boxes and another of the plurality of control boxes; and a branch line harness connecting the control box and the electrical component, wherein at least one of the plurality of control boxes is grounded via the electrical component connected to the branch line harness.

According to the circuit body for a vehicle having the configuration of (1) described above, the trunk line harness and the branch line harness constitute the framework of the circuit body, and the supply of electric power and the communication of the communication signal to the electrical component through the circuit body are controlled by the plurality of control boxes separately disposed on the circuit body. Therefore, if, for example, the transmission of communication signals is concentrated in one signal line by performing multiplex communication between the control boxes and, likewise, the power transmission is also concentrated in one power supply line, the structure of the circuit body can be simplified as compared with a circuit configuration of the related art in which a power source and an electrical component are connected, in principle, one to one. Further, when processes such as distribution of electric power to a plurality of systems, control of power supply or cutoff to each system, protection of electric wires and electrical components from excessive electric current, and the like are performed in the control box, it is not necessary to provide a junction box or the like used in the circuit body of the related art, and the structure of the circuit body can be further simplified.

In addition, the control box is grounded via a ground path which is provided in an electrical component for its own grounding. Therefore, even when a ground wire, for example, is omitted from a trunk line harness connecting one control box and another control box, if a branch line harness connecting another control box and an electrical component includes a ground wire, it is possible to achieve grounding of the one control box. As a result, it is possible to omit a ground wire from the trunk line harness, and thus the structure of the circuit body is further simplified. Furthermore, the length of the ground wire can be shortened by omitting a ground wire from the trunk line harness, and thus it is also possible to reduce that the ground wire functions as an antenna to be affected by surrounding noise.

As described above, according to the circuit body for a vehicle having the configuration, it is possible to simplify the structure of the circuit body while functions required as a circuit body for a vehicle are maintained.

According to one or more embodiments of the invention, it is possible to provide a circuit body for a vehicle which has a simplified structure of the circuit body while functions required as a circuit body for a vehicle are maintained.

Hereinbefore, one or more embodiments of the invention are briefly described. Further, the details of the invention will be further clarified by reading a mode for carrying out the invention (hereinafter, referred to as "embodiment") described below with reference to the accompanying drawings.

DETAILED DESCRIPTION

First Embodiment

Hereinafter, a circuit body (wire harness 1) for a vehicle according to a first embodiment of the invention will be described with reference to FIGS. 1 to 6.

Figure 1:
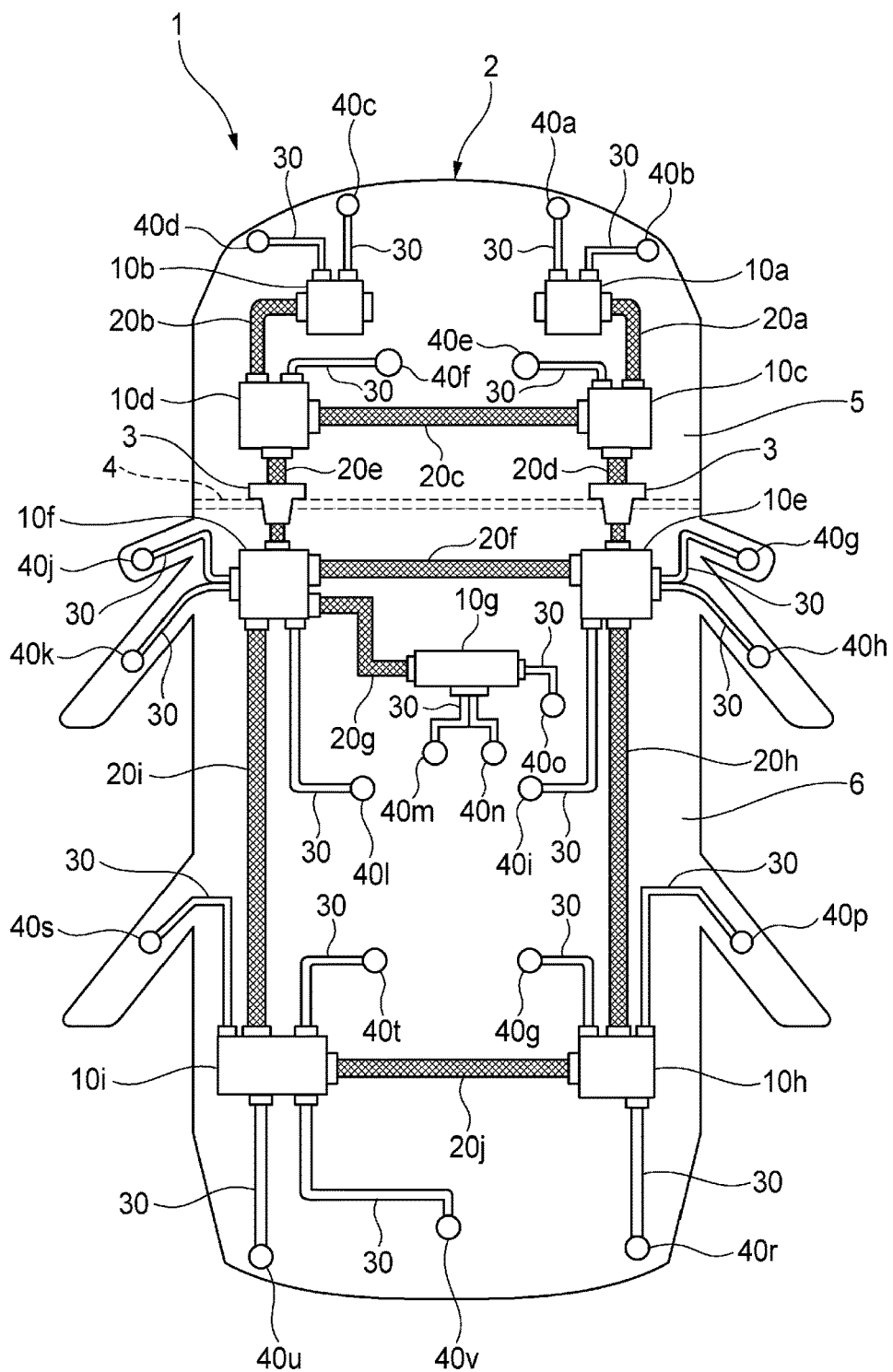
FIG. 1 is a schematic configuration diagram illustrating a state in which a wire harness according to a first embodiment of the invention is wired on a vehicle body.

As illustrated in FIG. 1, the wire harness 1 according to the first embodiment of the invention is used in a state where the wire harness 1 is typically wired on a vehicle body 2 on which various electrical components 40 (40a to 40v) are mounted. The wire harness 1 includes a plurality of electrical connection boxes 10 (10a to 10i), trunk line harnesses 20 (20a to 20j) which electrically connect between the electrical connection box 10 and the adjacent electrical connection box 10, and branch line harnesses 30 which electrically connect between the electrical connection box 10 and the adjacent electrical component 40.

Figure 3A:
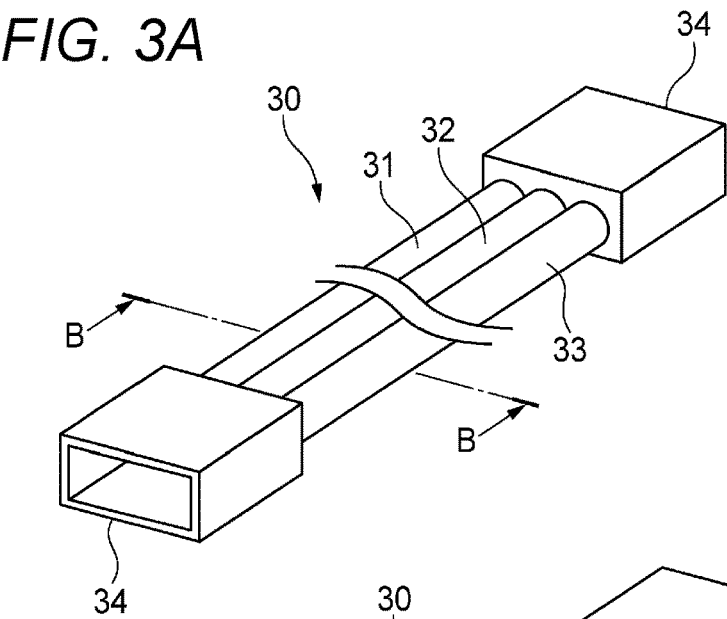
FIG. 3A is a perspective view of an I-type branch line harness connecting between an electrical connection box and an electrical component illustrated in FIG. 1.
Figure 3B:
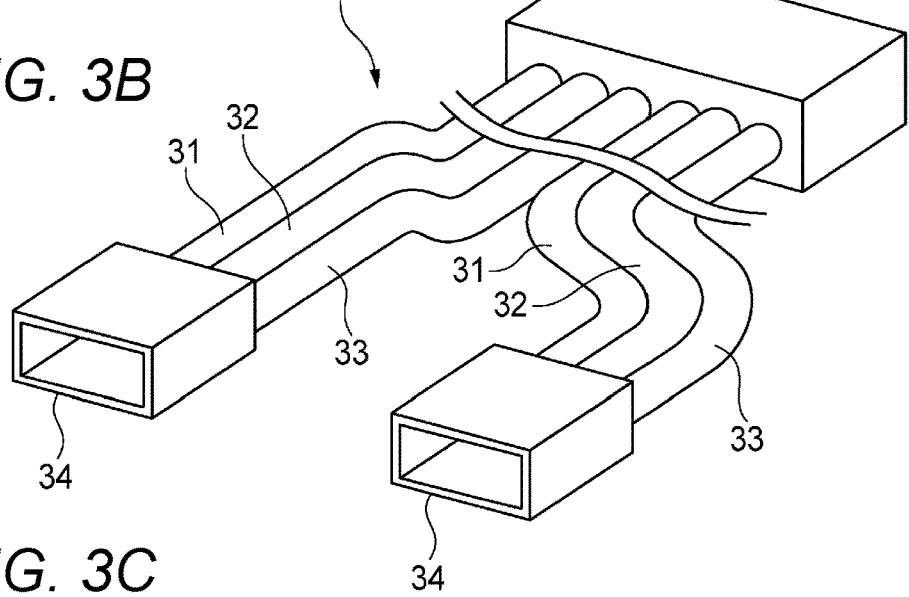
FIG. 3B is a perspective view of a V-type branch line harness connecting between an electrical connection box and an electrical component illustrated in FIG. 1.
Figure 3C:
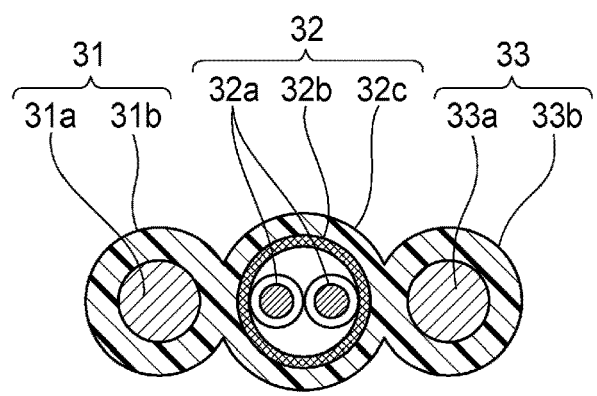
FIG. 3C is a cross-sectional view taken along the line B-B of FIG. 3A.
Figure 4:
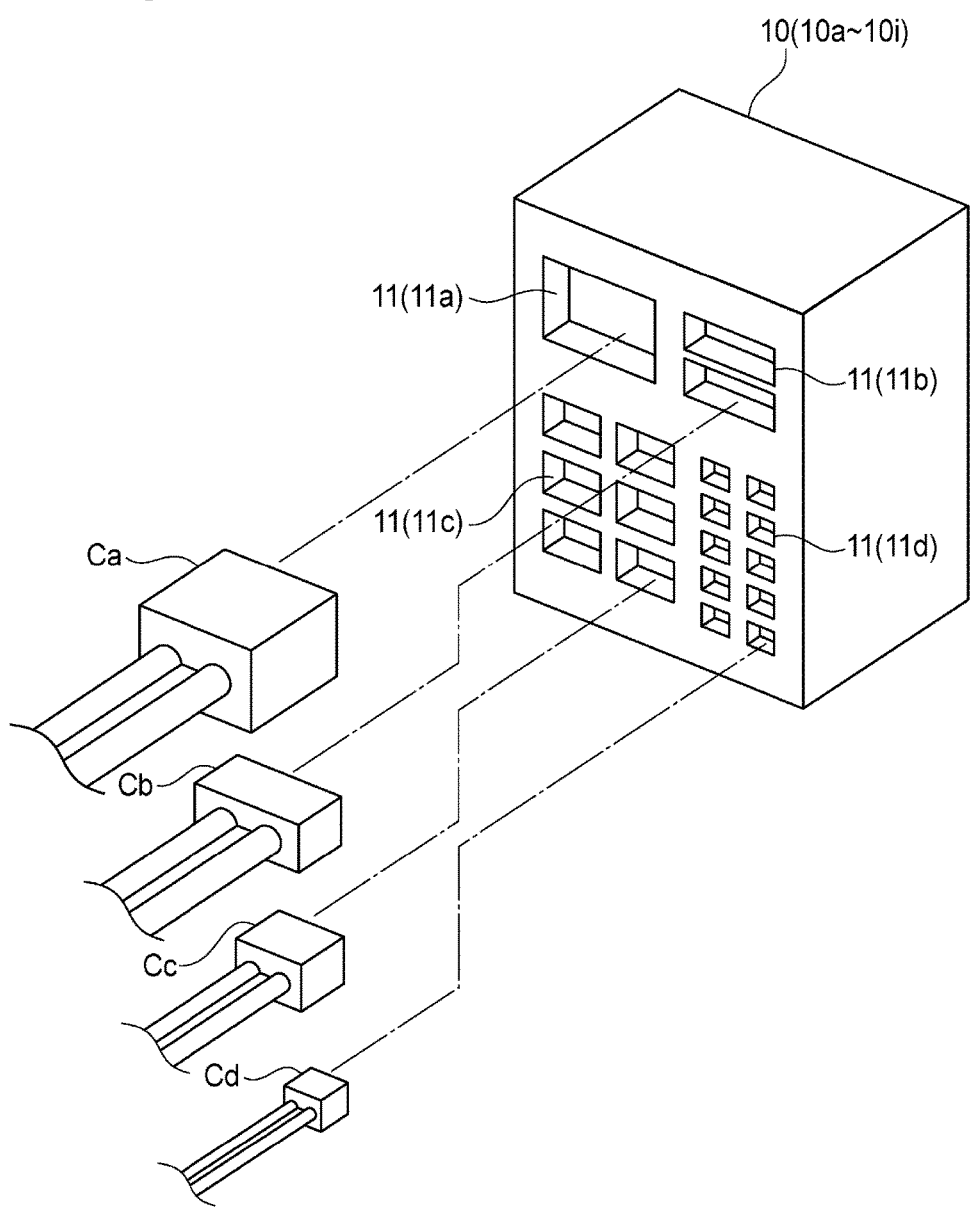
FIG. 4 is a perspective view of the electrical connection box illustrated in FIG. 1.

The electrical connection box 10 has a plurality of connector accommodation holes 11 (see FIG. 4). A connector 23 (see FIGS. 2A and 2B) of at least one trunk line harness 20 and a connector 34 (see FIGS. 3A to 3C) of at least one branch line harness 30 are connected to the plurality of connector accommodation holes 11 of each electrical connection box 10. Thus, each electrical connection box 10 is connected to at least one other electrical connection box 10 and at least one electrical component 40. The plurality of connector accommodation holes 11 will be described below.

Each electrical connection box 10 incorporates a microcomputer (not illustrated). Each electrical connection box 10 refers to ID information possessed by the other electrical connection box 10 and the electrical component 40 connected via the trunk line harness 20 and the branch line harness 30 using the microcomputer, thereby identifying the other electrical connection box 10 and the electrical component 40 connected thereto.

Further, each electrical connection box 10 can control the electrical components 40 connected thereto using the microcomputer or the like based on sensor signals, operation signals, and the like transmitted from other electrical connection boxes 10 and the electrical components 40 connected via the trunk line harness 20 and the branch line harness 30. Further, when two or more other electrical connection boxes 10 are connected via two or more trunk line harnesses 20, each electrical connection box 10 is able to relay the transmission of sensor signals, operation signals, and the like to and relay the transmission of electric power between the two or more other electrical connection boxes 10.

Figure 2A:
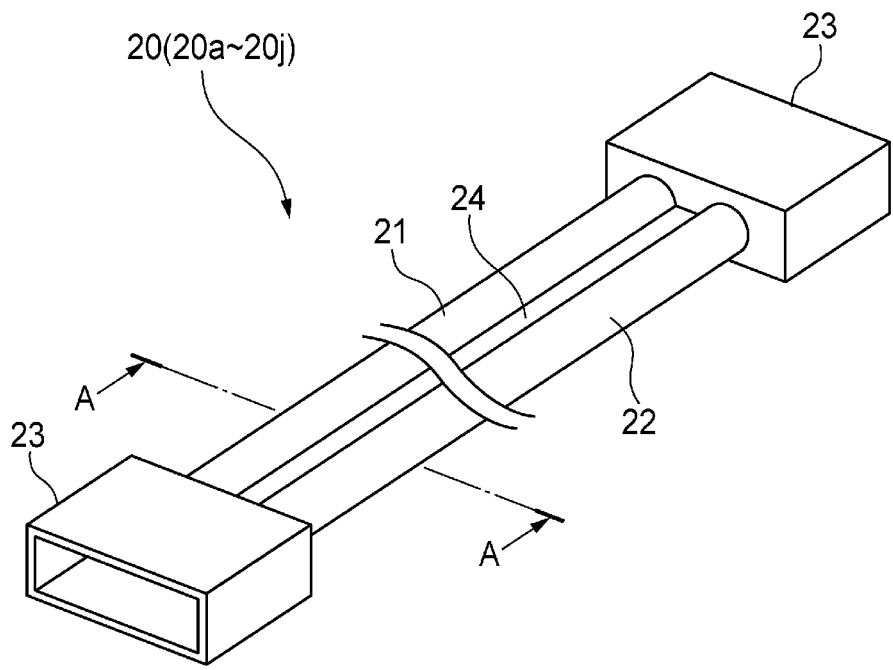
FIG. 2A is a perspective view of an I-type trunk line harness connecting between an electrical connection box and an electrical connection box illustrated in FIG. 1.

As illustrated in FIG. 2A, the trunk line harness 20 is a so-called I-type harness which includes one power supply line 21 for transmitting electric power, one communication line 22 for transmitting sensor signals, operation signals, or the like by multiplex communication, and a pair of connectors 23 connected to both ends of one set of the power supply line 21 and the communication line 22. The trunk line harness 20 is not provided with a ground wire for grounding.

Figure 2B:
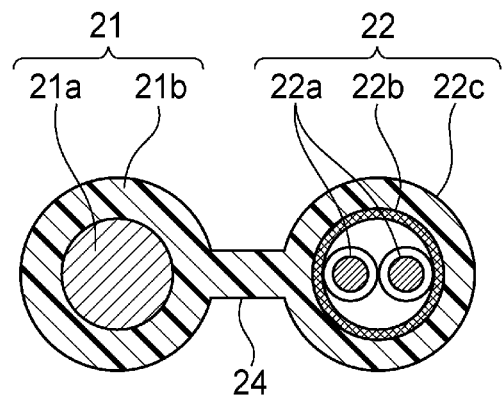
FIG. 2B is a cross-sectional view taken along the line A-A of FIG. 2A.

As illustrated in FIG. 2B, the power supply line 21 has a conductor wire 21a having a circular cross section for power transmission and an insulator 21b made of resin covering the conductor wire 21a. The communication line 22 has a pair of electric wires 22a for signal transmission, a braided conductor 22b covering the pair of electric wires 22a, and an insulator 22c made of resin covering the braided conductor 22b. The braided conductor 22b has a function of preventing the signal transmitted by the pair of electric wires 22a from being affected by noise caused by an external magnetic field or the like.

The insulator 21b of the power supply line 21 and the insulator 22c of the communication line 22 are integrally connected to each other over the entire region in an extending direction of the trunk line harness 20 by a connecting portion 24 made of resin. The connector 23 is provided with a plurality of terminals (not illustrated) electrically connected to the conductor wire 21a and the pair of electric wires 22a. The pair of connectors 23 located at both ends of the trunk line harness 20 are respectively inserted and connected to the connector accommodation holes 11 of the adjacent electrical connection boxes 10. Therefore, the adjacent electrical connection boxes 10 are electrically connected by the trunk line harness 20 so that power transmission and multiplex communication can be performed between the adjacent electrical connection boxes 10.

As illustrated in FIG. 3A, the branch line harness 30 is a so-called I-type harness which includes one power supply line 31 for transmitting electric power, one communication line 32 for transmitting sensor signals, operation signals, or the like by multiplex communication, one ground wire 33 for grounding, and a pair of connectors 34 connected to both ends of one set of the power supply line 31, the communication line 32, and the ground wire 33. As illustrated in FIG. 3B, the branch line harness 30 may be a so-called V-type harness in which one connector 34 which is connected to two sets of the power supply line 31, the communication line 32, and the ground wire 33 is provided on one end side, and two connectors 34 each of which is connected to one set of the power supply line 31, the communication line 32, and the ground wire 33 are provided.

As illustrated in FIG. 3C, the power supply line 31 has a conductor wire 31a having a circular cross section for power transmission and an insulator 31b made of resin covering the conductor wire 31a. The communication line 32 has a pair of electric wires 32a for signal transmission, a braided conductor 32b covering the pair of electric wires 32a, and an insulator 32c made of resin covering the braided conductor 32b. The braided conductor 32b has a function of preventing the signal transmitted by the pair of electric wires 32a from being affected by noise caused by an external magnetic field or the like. The ground wire 33 has a conductor wire 33a having a circular cross section for grounding and an insulator 33b made of resin covering the conductor wire 33a.

The insulator 31b of the power supply line 31 and the insulator 32c of the communication line 32, and the insulator 32c of the communication line 32 and the insulator 33b of the ground wire 33 are integrally connected over the entire region in the extending direction of the branch line harness 30 such that the power supply line 31, the communication line 32, and the ground wire 33 are aligned in a width direction. The connector 34 is provided with a plurality of terminals (not illustrated) electrically connected to the conductor wire 31a, the pair of electric wires 32a, and the conductor wire 33a. The connector 34 located at one end of the branch line harness 30 is inserted and connected to the connector accommodation hole 11 of the electrical connection box 10, and the connector 34 located at the other end of the branch line harness 30 is inserted and connected to the connector accommodation hole (not illustrated) of the electrical component 40. Therefore, the electrical connection box 10 and the electrical component 40 are electrically connected by the branch line harness 30, and thus power transmission and multiplex communication become possible between the electrical connection box 10 and the electrical component 40.

In the example illustrated in FIG. 1, each electrical connection box 10 is arranged at a position relatively close to a mounting position of the connected electrical component 40 on the vehicle body 2. Therefore, the length of the branch line harness 30 connected to each electrical connection box 10 is relatively short. On the other hand, some adjacent electrical connection boxes 10 have a large distance therebetween. Therefore, the plurality of trunk line harnesses 20 include relatively long one.

Specifically, in the example illustrated in FIG. 1, an electrical connection box 10a is connected to a direction indication lamp 40a on the right front side of the vehicle body, and a right headlight 40b. An electrical connection box 10b is connected to a left headlight 40c and a direction indication lamp 40d on the left front side of the vehicle body. An electrical connection box 10c is connected to a brake control module 40e. An electrical connection box 10d is connected to a fuel injection control module 40f. An electrical connection box 10e is connected to a right electric door mirror 40g, an electrical component 40h of a right front door, and an electrical component 4i around a right front electric seat. An electrical connection box 10f is connected to a left electric door mirror 40j, an electrical component 40k of a left front door, and an electrical component 40l around a left front electric seat. An electrical connection box 10g is connected to an electrical component 40m around an air conditioner, an electrical component 40n around a head-up display, and an electrical component 40o around a steering wheel. An electrical connection box 10h is connected to an electrical component 40p of a right rear door, an electrical component 40q around a right rear electric seat, and a direction indication lamp 40r of a right rear side of the vehicle body. An electrical connection box 10i is connected to an electrical component 40s of a left rear door, an electrical component 40t around a left rear electric seat, a direction indication lamp 40u on a left rear side of the vehicle body, and a high mount stop lamp 40v.

Here, the V-type branch line harnesses 30 illustrated in FIG. 3B are used for the connection among the electrical connection box 10e, the right electric door mirror 40g, and the electrical component 40h of the right front door, the connection among the electrical connection box 10f, the left electric door mirror 40j, and the electrical component 40k of the left front door, and the connection among the electrical connection box 10g, the electrical component 40m around the air conditioner, and the electrical component 40n around the head-up display, and the I-type branch line harnesses 30 illustrated in FIG. 3A are used for the other connections of the electrical connection boxes 10 and the electrical components 40.

The electrical connection boxes 10a and 10c are connected by the trunk line harness 20a. The electrical connection boxes 10b and 10d are connected by the trunk line harness 20b. The electrical connection boxes 10c and 10d are connected by the trunk line harness 20c. The electrical connection boxes 10c and 10e are connected by the trunk line harness 20d. The electrical connection boxes 10d and 10f are connected by the trunk line harness 20e. The electrical connection boxes 10e and 10f are connected by the trunk line harness 20f. The electrical connection boxes 10f and 10g are connected by the trunk line harness 20g. The electrical connection boxes 10e and 10h are connected by the trunk line harness 20h. The electrical connection boxes 10f and 10i are connected by the trunk line harness 20i. The electrical connection boxes 10h and 10i are connected by the trunk line harness 20j.

In particular, each of the trunk line harnesses 20d and 20e is inserted through a through hole provided in a dash panel 4 of the vehicle body 2. Specifically, grommets 3 (exterior member) through which the trunk line harnesses 20d and 20d are respectively inserted are respectively fixed to the through holes, whereby an engine room 5 and a passenger compartment 6 interposing the dash panel 4 therebetween are partitioned in a liquid-tight manner.

In the example illustrated in FIG. 1, at least some of the plurality of electrical components 40 (40a to 40v) mounted on the vehicle body 2 are connected to corresponding ground points (not illustrated) of the vehicle body 2, respectively, to be grounded. For example, when the electrical component 40 has a metallic housing, the electrical component 40 can be grounded by electrically connecting (screwing or the like) the housing to the vehicle body 2 (including a reinforcement or the like). Therefore, the branch line harness 30 (FIG. 10) may be constituted only of the power supply line 31 and the communication line 32. Further, when it is difficult to provide a ground point around the electrical connection box 10 connected to the electrical component 40, the electrical component 40 and the electrical connection box 10 may be connected using the branch line harness 30 having the power supply line 31, the communication line 32, and the ground wire 33 such that the electrical connection box 10 is grounded by the electrical component 40. In this case, the electrical connection box 10 can be grounded via the electrical component 40 and the branch line harness 30 (FIGS. 3A to 3C).

when the electrical component 40 among the plurality of electrical components 40, such as the electrical component 40 which is difficult to provide the ground point in the vicinity thereof or the electrical component 40 which is covered with a housing made of resin, is difficult to be grounded to the vehicle body 2, it is also possible to ground the electrical connection box 10 connected to the electrical component 40 via the branch line harness 30 (FIGS. 3A to 3C) to the vehicle body 2 and to ground the electrical component 40 via the branch line harness 30 and the electrical connection box 10.

As a result, it is not necessary to provide a ground wire to the trunk line harness 20 connecting the electrical connection boxes 10 to ground the plurality of electrical connection boxes 10. Therefore, in the wire harness 1, there is no ground wire in the trunk line harness 20. As described above, the plurality of trunk line harnesses 20 include relatively long one. Therefore, the total extending length of the ground wire as the entirety of the wire harness 1 can be greatly shortened as compared with an aspect in which ground wires are provided for all of the plurality of trunk line harnesses 20 connecting the electrical connection boxes 10. Thus, the weight of the wire harness 1 can be reduced and the size thereof can be reduced. Further, by drastically shortening the total extending length of the ground wire, the extent that noise is applied to the wire harness 1 due to the fact that the ground wire functions as an antenna can also be greatly reduced.

In the example illustrated in FIG. 1, a plurality of loop circuits are constituted by connecting the plurality of electrical connection boxes 10 with the plurality of trunk line harnesses 20. Specifically, there are two loop circuits such as a loop circuit connected in order of "electrical connection box 10c-trunk line harness 20c-electrical connection box 10d-trunk line harness 20e-electrical connection box 10f-trunk line harness 20f-electrical connection box 10e-trunk line harness 20d-electrical connection box 10c" and a loop circuit connected in order of "electrical connection box 10e-trunk line harness 20f-electrical connection box 10f-trunk line harness 20i-electrical connection box 10i-trunk line harness 20j-electrical connection box 10h-trunk line harness 20h-electrical connection box 10e".

Therefore, even when an abnormality such as disconnection occurs in a part of the trunk line harness 20, it is easy to secure a detour route. Therefore, the wire harness 1 can greatly enhance the redundancy of the system using the wire harness 1.

Hereinafter, the plurality of the connector accommodation holes 11 included in the electrical connection box 10 will be described with reference to FIG. 4. As illustrated in FIG. 4, in the electrical connection box 10, the plurality of connector accommodation holes 11 having a plurality of sizes are formed. The plurality of sizes include a size (corresponding to the size of the connector accommodation hole 11a) in which one connector accommodation hole 11 having that size is formed, and a size (corresponding to the sizes of the connector accommodation holes 11b to 11d) in which the plurality of the connector accommodation holes 11 having those sizes are formed.

In the example illustrated in FIG. 4, a plurality of connector accommodation holes 11 having four sizes are formed, and specifically, one connector accommodation hole 11a, two connector accommodation holes 11b, six connector accommodation holes 11c, and ten connector accommodation holes 11d are formed in descending order of size. Connectors Ca to Cd of sub-harnesses having corresponding sizes are respectively connected to the connector accommodation holes 11a to 11d. Specifically, the connectors Ca to Cd are the connector 23 of the trunk line harness 20 and the connector 34 of the branch line harness 30.

In the example illustrated in FIG. 4, as the magnitude of the current flowing through the sub-harness is larger, the connectors Ca to Cd having larger sizes are connected to the sub-harnesses. Therefore, the size of the connector accommodation hole 11 corresponds to the magnitude (specifically, the magnitude of the current flowing through the power supply lines 21 and 31) of the current flowing through the sub-harness connected to the connector accommodation hole 11. As a result, compared with an aspect in which the sizes of the connectors of the plurality of sub-harnesses and the sizes of the plurality of the connector accommodation holes 11 are unified into the largest size, the electrical connection box 10 does not require excessive specifications, and thus the size of the electrical connection box 10 can be greatly reduced.

Further, as described above, the electrical connection box 10 can identify a connection destination by referring to the ID information of the connection destination of the connected sub-harness using the microcomputer incorporated therein. In other words, it has connection compatibility. Therefore, when a plurality of connectors of the sub-harnesses having the same size are connected to a plurality of corresponding connector accommodation holes 11 having the same size, it is possible to identify each of the connection destinations and form a desired circuit regardless of which one of the connectors is connected to any of the connector accommodation holes 11. As a result, compared with an aspect in which the connector accommodation holes 11 are respectively designated to be connected to respective connectors, it is possible to greatly reduce the worker's burden when the connector of the sub-harness is connected to the connector accommodation hole 11.

Next, an example of a manufacturing method of the wire harness 1 described above will be described with reference to the drawings.

Figure 5A:
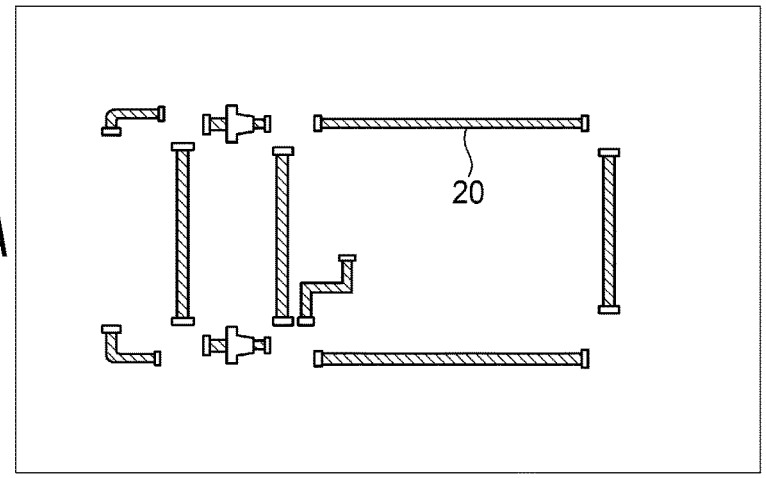
FIGS. 5A to 5C are diagrams for explaining a procedure for manufacturing the wire harness illustrated in FIG. 1.
Figure 6:
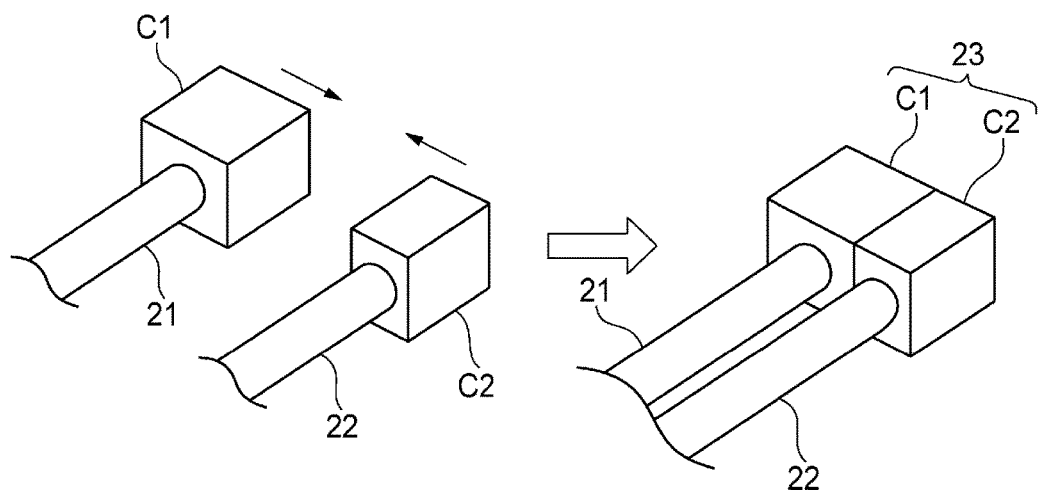
FIG. 6 is a diagram for explaining a procedure when a trunk line harness is constituted by combining a connector connected to a power supply line and a connector connected to a communication line.

First, as illustrated in FIG. 5A, the trunk line harnesses 20 are configured to correspond to a wire routing form to the vehicle body. In this case, the trunk line harness 20 may be configured such that the power supply line 21 and the communication line 22 are constituted as one electric wire as illustrated in FIG. 2, or may be configured such that the power supply line 21 and the communication line 22 are constituted as separate electric wires as illustrated in FIG. 6.

In a case of the former (one electric wire), for example, the trunk line harness 20 can be configured by collectively extruding the power supply line 21 and the communication line 22 to provide the connecting portion 24 while the power supply line 21 and the communication line 22 are covered with the insulator 21b and the insulator 22c. On the other hand, in a case of the latter (separate electric wires), as illustrated in FIG. 6, for example, the power supply line 21 and the communication line 22 are prepared in a state of being separate from each other, and a pair of connectors C1 connected to both ends of the power supply line 21 of the trunk line harness 20 and a pair of connectors C2 connected to both ends of the communication line 22 of the trunk line harness 20 are connected to each other such that the connectors located at corresponding ends are connected, respectively, by a connection structure (not illustrated). Therefore, an I-type trunk line harness 20 which includes one power supply line 21, one communication line 22, and a pair of connectors 23 (=connector C1+connector C2) connected to both ends of one set of the power supply line 21 and the communication line 22 can be obtained. As described above, the trunk line harness 20 illustrated in FIG. 6 differs from the trunk line harness 20 illustrated in FIG. 2 in that the power supply line 21 and the communication line 22 are not connected over the entire region in the extending direction.

Figure 5B:
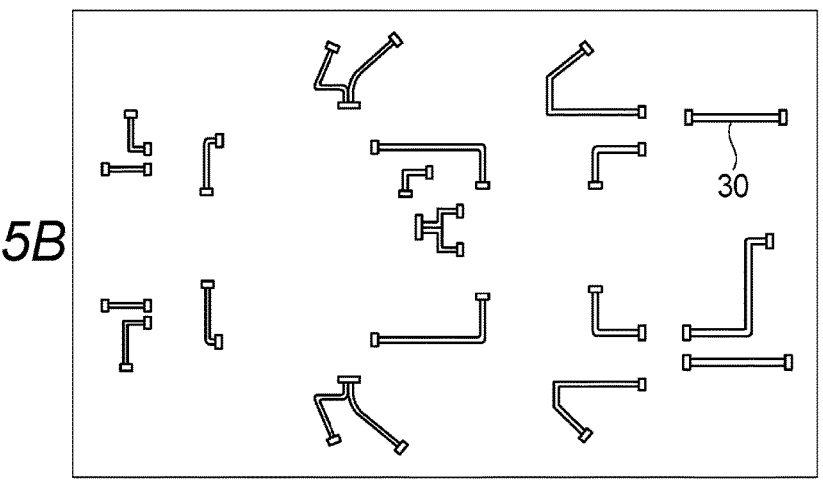

Next, as illustrated in FIG. 5B, the branch line harnesses 30 are configured to correspond to a wire routing form to the vehicle body.

Figure 5C:
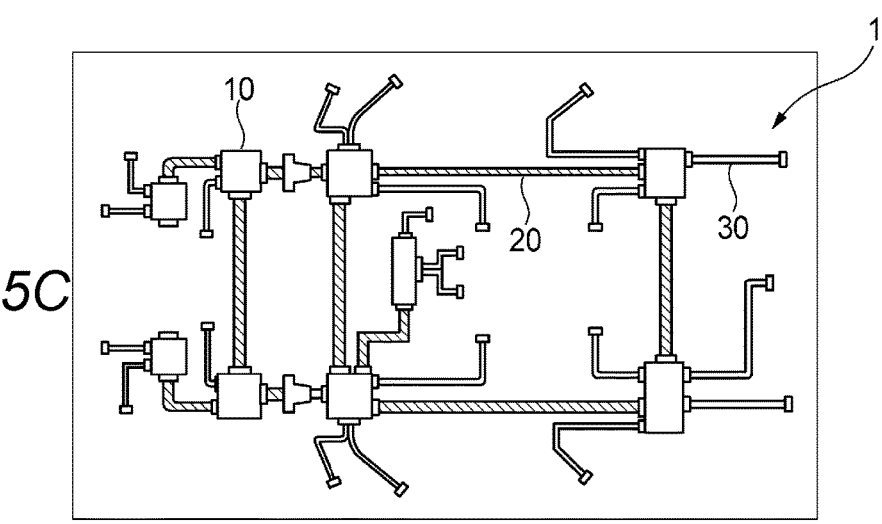

Then, as illustrated in FIG. 5C, the trunk line harnesses 20 and the branch line harnesses 30 are connected to corresponding electrical connection boxes 10 of the plurality of electrical connection boxes 10 in order. As a result, the wire harness 1 is formed.

Compared with a circuit configuration in which a power supply and an electrical component are connected, in principle, one to one as similar to the circuit body of the related art described above, the manufacturing process of the wire harness 1 can be simplified by such a manufacturing method, and thus the productivity of the wire harness 1 is improved. Further, for example, it is also possible to further improve the productivity by integrating the branch line harness 30 for each area on the vehicle body or the like.

Second Embodiment

Hereinafter, a circuit body (wire harness 1A and wire harness 1B) for a vehicle according to a second embodiment of the invention will be described with reference to FIGS. 7 to 9F.

The wire harnesses 1A and 1B according to the second embodiment differ from the wire harness 1 illustrated in FIG. 1 in that the circuit body is applied to a vehicle body 2A of a vehicle with a right-side steering wheel specification or a vehicle body 2B of a vehicle with a left-side steering wheel specification in the second embodiment. For convenience of explanation, in FIGS. 7 to 9F, parts having substantially the same structures and functions as those illustrated in FIG. 1 are denoted by the same reference numerals and letters as those given to such parts in FIG. 1. Further, the detailed descriptions of those parts will be appropriately omitted.

Figure 7:
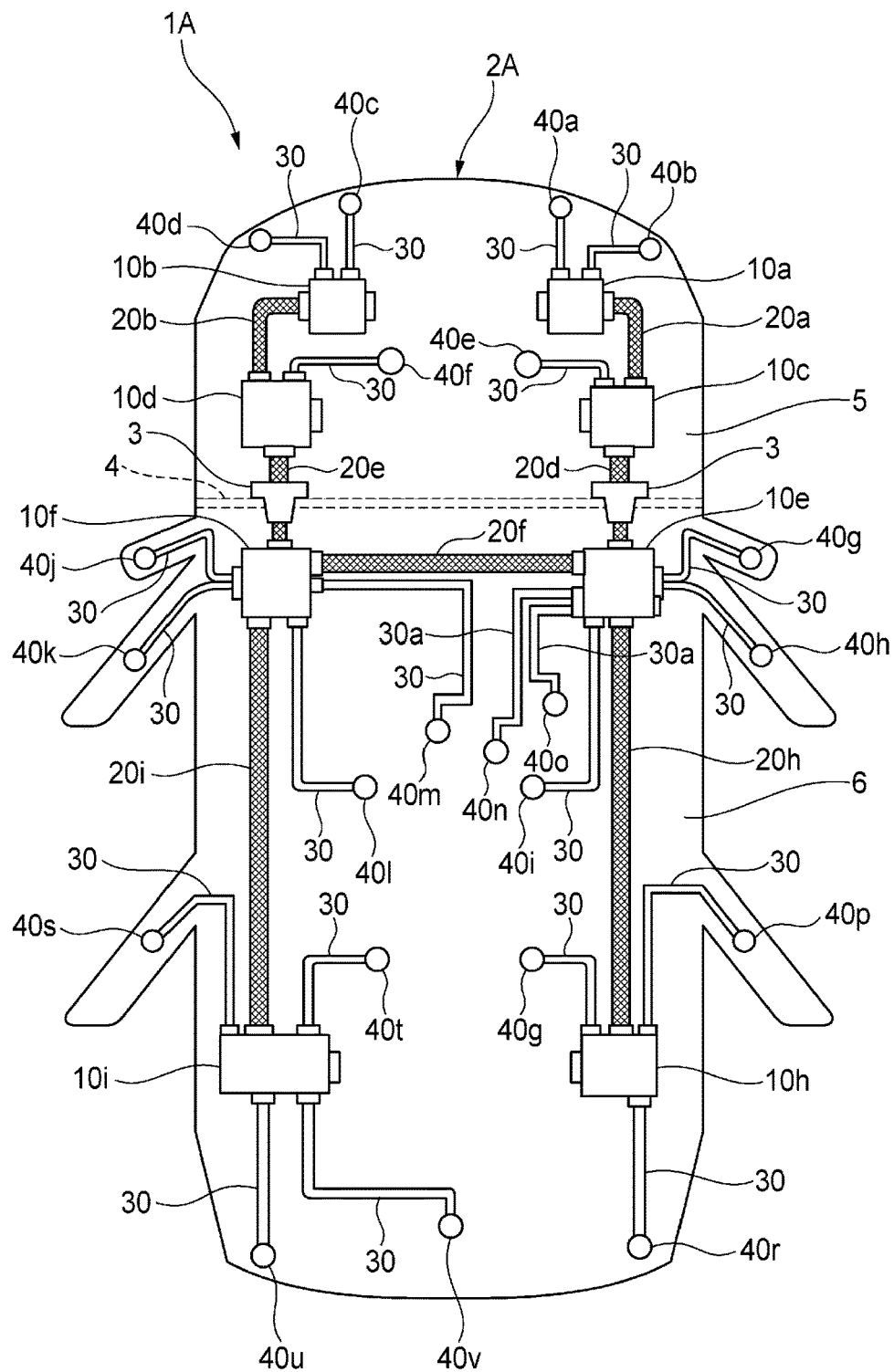
FIG. 7 is a schematic configuration diagram illustrating a state in which a wire harness according to a second embodiment of the invention is wired on a vehicle body of a vehicle with a right-side steering wheel specification.

FIG. 7 illustrates an example in which the wire harness 1A is wired on the vehicle body 2A of a vehicle with a right-side steering wheel specification. As illustrated in FIG. 7, the wire harness 1A includes a branch line harness 30 (including a branch line harness 30a) for the right-side steering wheel in addition to the plurality of electrical connection boxes 10 and trunk line harnesses 20.

The branch line harness 30 for the right-side steering wheel corresponds to the vehicle body 2A of the right-side steering wheel specification, and the electrical component 40o around a steering wheel and the electrical component 40n around a head-up display are connected to an electrical connection box 10e provided on the right side in the vicinity of an instrument panel of the vehicle body 2A via the branch line harnesses 30a. Therefore, it is possible to connect the electrical component 40o and the electrical component 40n to the electrical connection box 10e at a shorter distance as compared with the example of FIG. 1, and it is possible to remove a central power connection box 10g provided in the example of FIG. 1.

Figure 8:
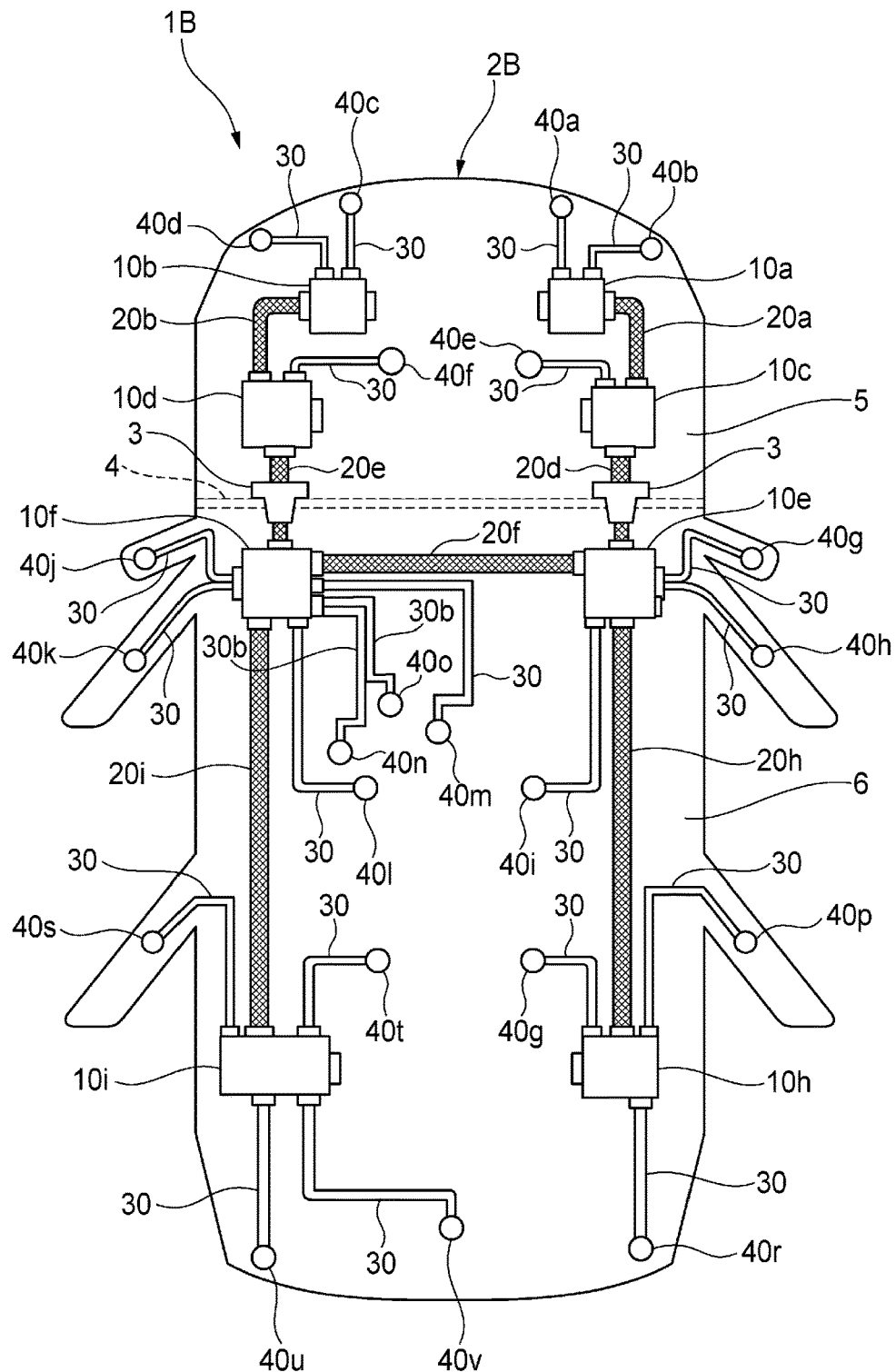
FIG. 8 is a schematic configuration diagram illustrating a state in which the wire harness according to the second embodiment of the invention is wired on a vehicle body of a vehicle with a left-side steering wheel specification.

FIG. 8 illustrates an example in which the wire harness 1B is wired on the vehicle body 2B of a vehicle with a left-side steering wheel specification. As illustrated in FIG. 8, the wire harness 1B includes a branch line harness 30 (including a branch line harness 30b) for the left-side steering wheel in addition to the plurality of electrical connection boxes 10 and trunk line harnesses 20.

The branch line harness 30 for the left-side steering wheel corresponds to the vehicle body 2B of the left-side steering wheel specification, and the electrical component 40o around a steering wheel and the electrical component 40n around a head-up display are connected to an electrical connection box 10f provided on the left side in the vicinity of an instrument panel of the vehicle body 2B via the branch line harnesses 30b. Therefore, as similar to FIG. 7, it is possible to connect the electrical component 40o and the electrical component 40n to the electrical connection box 10f at a short distance as compared with the example of FIG. 1, and it is possible to remove the central power connection box 10g provided in the example of FIG. 1.

In the examples illustrated in FIGS. 7 and 8, unlike the example illustrated in FIG. 1, a loop circuit constituted of a plurality of electrical connection boxes 10 and a plurality of trunk line harnesses 20 is not configured. Depending on the degree of redundancy required for a circuit body (wire harness) for a vehicle, it may be determined whether to configure the loop circuit as illustrated in FIGS. 1, 7, and 8. Details will be described below.

Next, an example of a manufacturing method of the wire harness 1A or the wire harness 1B described above will be described with reference to the drawings.

Figure 9A:
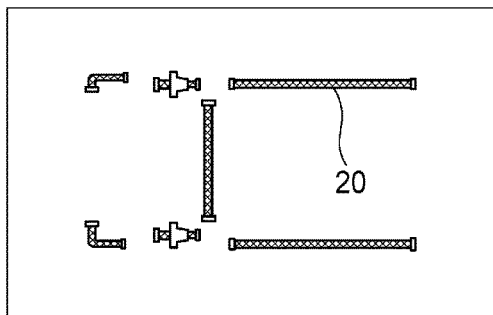
FIGS. 9A to 9F are diagrams for explaining a procedure in manufacturing the wire harness illustrated in FIGS. 7 and 8.

First, as illustrated in FIG. 9A, the trunk line harnesses 20 are configured to correspond to a wire routing form to the vehicle body. In this case, the trunk line harness 20 may be configured such that the power supply line 21 and the communication line 22 are constituted as one electric wire as illustrated in FIG. 2, or may be configured such that the power supply line 21 and the communication line 22 are constituted as separate electric wires as illustrated in FIG. 6. Examples of the manufacturing methods of the trunk line harness 20 in the cases of the former (one electric wire) and the latter (separate electric wires) are the same as those of the first embodiment described above.

Figure 9B:
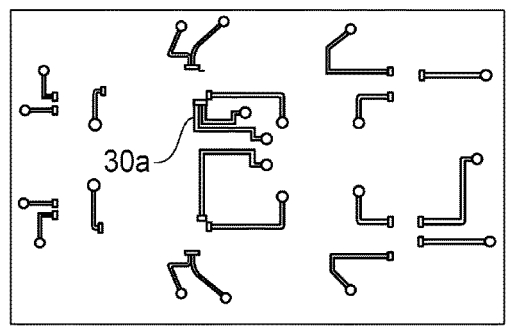
Figure 9C:
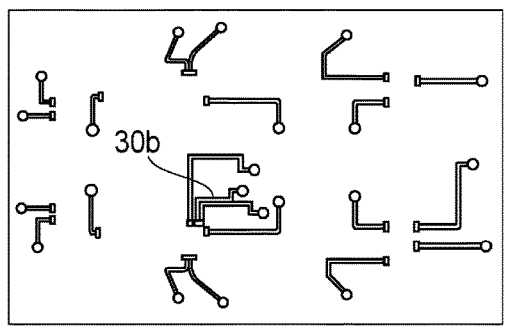

Next, as illustrated in FIG. 9B, in a case of the wire harness 1A for a vehicle with the right-side steering wheel specification, the branch line harnesses 30 (including the branch line harnesses 30a) for the right-side steering wheel are configured to correspond to the wire routing form to the vehicle body. On the other hand, as illustrated in FIG. 9C, in a case of the wire harness 1B for a vehicle with the left-side steering wheel specification, the branch line harnesses 30 (including the branch line harnesses 30b) for the left-side steering wheel are configured to correspond to the wire routing form to the vehicle body.

Figure 9D:
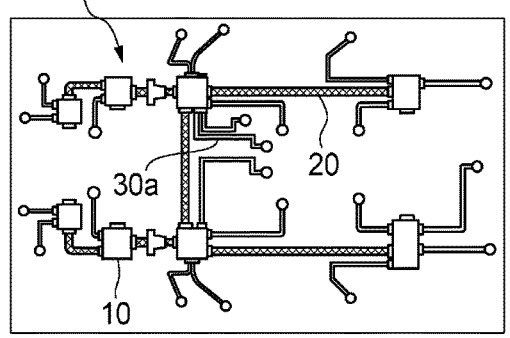
Figure 9E:
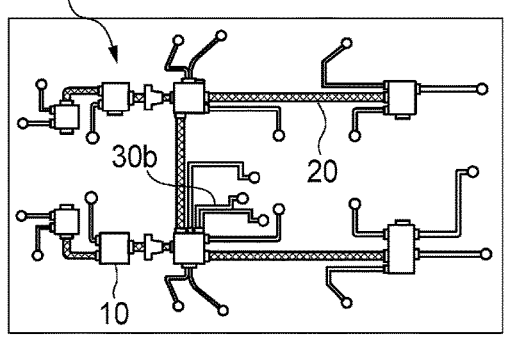

Then, as illustrated in FIG. 9D, the trunk line harnesses 20 and the branch line harnesses 30 (including the branch line harnesses 30a) are connected to corresponding electrical connection boxes 10 of the plurality of electrical connection boxes 10 in order. As a result, the wire harness 1A for a vehicle with a right-side steering wheel specification is formed. Similarly, as illustrated in FIG. 9E, the trunk line harnesses 20 and the branch line harnesses 30 (including the branch line harnesses 30b) are connected to corresponding electrical connection boxes 10 of the plurality of electrical connection boxes 10 in order. As a result, the wire harness 1B for a vehicle with a left-side steering wheel specification is formed.

It is possible to simplify the manufacturing process of the wire harness 1A for a vehicle with a right-side steering wheel specification and the wire harness 1B for a vehicle with a left-side steering wheel specification with such a manufacturing method, and thus the productivity thereof is improved. Further, parts having a common structure can be used regardless of those specifications, and thus versatility is high. Therefore, practically, it is possible to deal with the difference in specifications depending on the steering wheel position simply by selecting the branch line harness 30a with the right-side steering wheel specification or the branch line harness 30b with the left-side steering wheel specification.

Figure 9F:
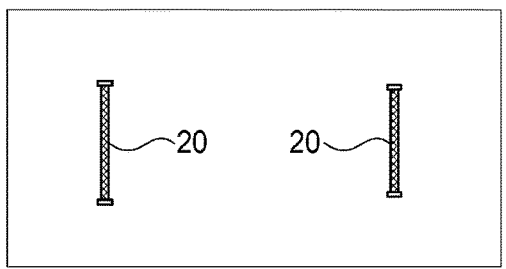

When a loop circuit is configured in the circuits of FIGS. 7 and 8, it is sufficient to selectively connect the trunk line harnesses 20 of FIG. 9F to the trunk line harnesses 20 of FIG. 9A.

Other Embodiments

The invention is not limited to the embodiments described above and various modification examples can be adopted within the scope of the invention. For example, the invention is not limited to the embodiments described above and can be appropriately modified, improved, and the like. In addition, materials, shapes, dimensions, numbers, placement locations, and the like of constituent elements in the embodiments described above are arbitrary as far as the invention can be achieved and are not limited thereto.

For example, in the first and second embodiments, the electrical component 40 has ID information. However, instead of the electrical component 40, the connector provided at the end of the branch line harness 30 may have the ID information.

Figure 10A:
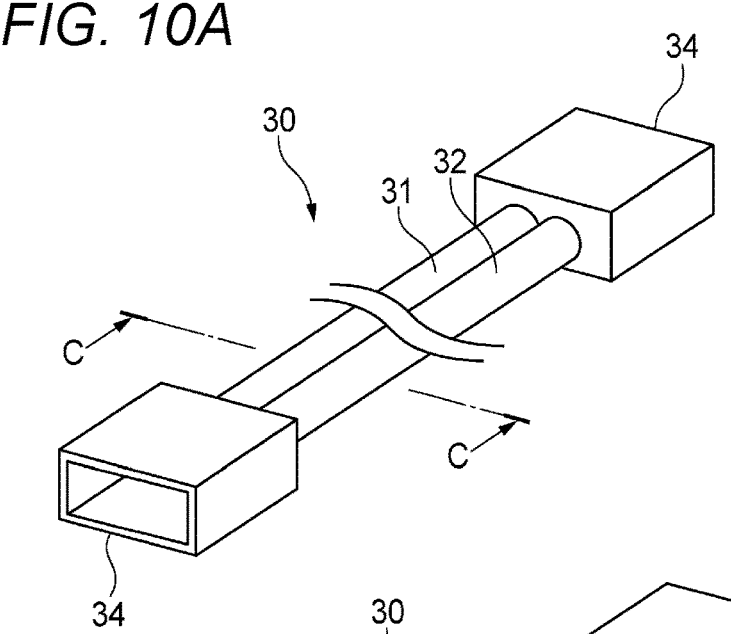
FIGS. 10A to 10C are perspective views of branch line harnesses according to another embodiment of the invention.
Figure 10B:
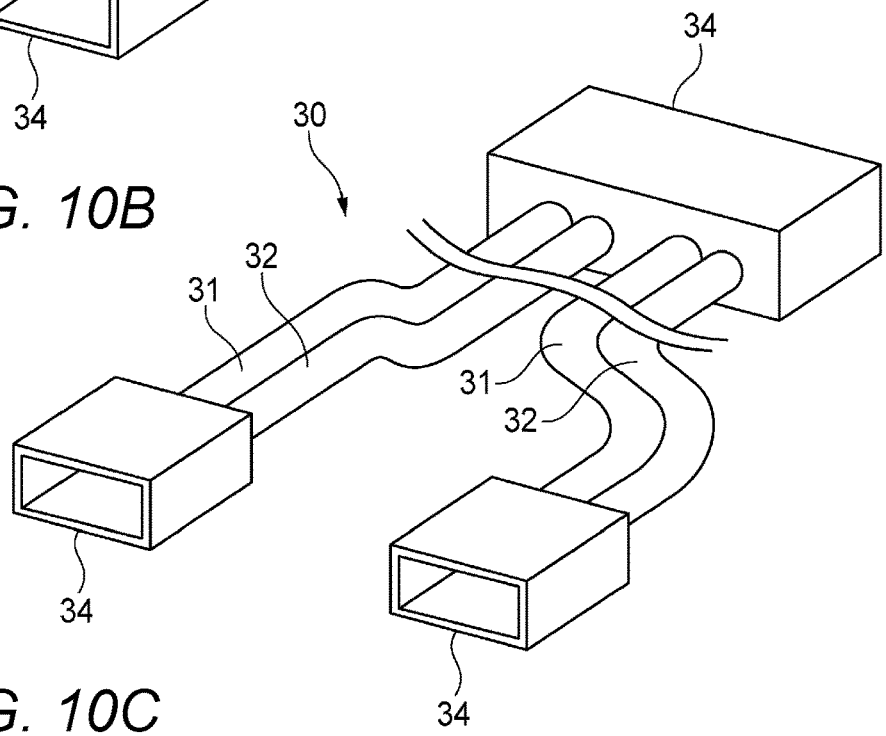
Figure 10C:
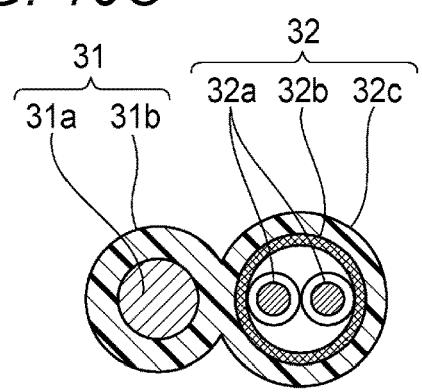

Furthermore, in the first and second embodiments, the branch line harness 30 has the ground wire 33 (see FIGS. 3A to 3C). However, when it is not necessary to provide the ground wire 33 in the branch line harness 30, it may be configured such that the ground wire 33 is included in the power supply line 31 and the communication line 32, not in the branch line harness 30 as illustrated in FIGS. 10A to 10C.

In the first and second embodiments, each of the trunk line harness 20 and the branch line harness 30 has only one power supply line 31 (see FIGS. 2A to 3C). However, if necessary, each of the trunk line harness 20 and the branch line harness 30 may be configured to have a plurality (for example, two) of power supply lines 31.

Further, the electrical connection box 10 may be configured to have an antenna capable of wireless communication with the outside in addition to the various functions described above such that it is possible to process various kinds of information exchanged with the outside and to transmit and receive the information via the communication line 32.

Here, the features of the circuit body for a vehicle according to one or more embodiments of the invention described above are briefly summarized and listed below in (1).

(1) A circuit body (1) for a vehicle which is wired on a vehicle body of the vehicle for performing supply of electric power to an electrical component (40) and communication of various communication signals with the electrical component, the circuit body including:

a plurality of control boxes (10) separately disposed on the circuit body and capable of controlling input and output of at least one of the electric power and the communication signal;

a trunk line harness (20) connecting one of the plurality of control boxes and another of the plurality of control boxes; and a branch line harness (30) connecting the control box and the electrical component, wherein at least one of the plurality of control boxes (10) is grounded via the electrical component (40) connected to the branch line harness (30).

The invention claimed is:

1. A circuit body for a vehicle which is wired on a vehicle body of the vehicle for performing supply of electric power to an electrical component and communication of various communication signals with the electrical component, the circuit body including:
    a plurality of control boxes separately disposed on the circuit body and capable of controlling input and output of at least one of the electric power and the communication signal;
    a trunk line harness connecting one of the plurality of control boxes and another of the plurality of control boxes; and
    a branch line harness connecting the one of the plurality of control boxes and the electrical component,
    wherein the one of the plurality of control boxes is grounded via the electrical component connected to the branch line harness, and
    wherein the trunk line comprises a first power supply line configured to transmit the electric power and a first communication line configured to transmit a signal with no ground wire.

2. The circuit body according to claim 1,
wherein the plurality of control boxes are grounded only via the electrical component connected to the branch line harness.

3. The circuit body according to claim 1,
wherein the branch line harness includes
    a second power supply line,
    a second communication line mounted on the second power supply line, and
    a ground wire mounted on the second communication line.

4. The circuit body according to claim 3,
wherein the second power supply line includes a conductor wire encapsulated by an insulator.

5. The circuit body according to claim 3,
wherein the second communication line includes a plurality of electric wires encapsulated by a braided conductor and an insulator encapsulating the braided conductor and the plurality of electric wires.

* * * * *